United States Patent
Conner et al.

(10) Patent No.: US 8,627,433 B2
(45) Date of Patent: Jan. 7, 2014

(54) SYSTEM AND METHOD FOR AUTHENTICATING A REQUEST FOR ACCESS TO A SECURED DEVICE

(75) Inventors: Bruce D. Conner, Ypsilanti, MI (US); Vipul M. Patel, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 13/249,840

(22) Filed: Sep. 30, 2011

(65) Prior Publication Data

US 2013/0086664 A1    Apr. 4, 2013

(51) Int. Cl.
*H04L 29/06*    (2006.01)

(52) U.S. Cl.
USPC ............................... 726/7; 713/172; 713/168

(58) Field of Classification Search
USPC ............................ 726/7, 2, 14; 713/168, 172
See application file for complete search history.

(56) References Cited

U.S. PATENT DOCUMENTS

| | | | |
|---|---|---|---|
| 6,801,134 B1 * | 10/2004 | Juzswik | ...................... 340/12.51 |
| 7,583,204 B2 | 9/2009 | McCarthy et al. | |
| 7,724,125 B2 | 5/2010 | Ghabra et al. | |
| 7,786,843 B2 | 8/2010 | Witkowski | |
| 7,786,848 B2 | 8/2010 | Trudel et al. | |
| 7,855,633 B2 | 12/2010 | Chuey | |
| 7,869,392 B2 | 1/2011 | Sabo et al. | |
| 7,897,888 B2 | 3/2011 | Dimig | |
| 7,916,021 B2 | 3/2011 | Lickfelt et al. | |
| 7,928,829 B2 | 4/2011 | Hermann | |
| 7,970,446 B2 | 6/2011 | Witkowski et al. | |
| 7,974,251 B2 | 7/2011 | Gercekci et al. | |
| 7,986,215 B2 | 7/2011 | Beehler et al. | |
| 8,009,023 B2 | 8/2011 | Bergerhoff et al. | |
| 8,019,283 B2 | 9/2011 | Eisenbach | |
| 8,022,808 B2 | 9/2011 | Kurpinski et al. | |
| 8,026,793 B2 | 9/2011 | Luo et al. | |
| 2007/0160206 A1 * | 7/2007 | Ostrander et al. | ............ 380/203 |
| 2007/0167162 A1 * | 7/2007 | Kim et al. | .................. 455/435.1 |
| 2007/0192596 A1 * | 8/2007 | Otsuka | .......................... 713/166 |
| 2008/0297415 A1 * | 12/2008 | Berens et al. | ................. 342/372 |
| 2011/0316680 A1 * | 12/2011 | Heininger | .................. 340/425.5 |

* cited by examiner

*Primary Examiner* — Matthew Smithers
(74) *Attorney, Agent, or Firm* — Cantor Colburn LLP

(57) ABSTRACT

A method for authenticating a request for access comprises monitoring one or more ambient transmissions present in a local environment, analyzing the one or more ambient transmissions to create a characterization thereof, and transmitting information configured to instruct a security token regarding characteristics of an adapted transmission protocol based on the characterization. The adapted transmission protocol is configured for decreasing a likelihood of interference by the one or more ambient transmissions with reception of an authentication transmission from the security token. An authentication transmission comprising authentication information is received from the security token, and the security token is authenticated based on the authentication information. In response to a request for access, a signal is transmitted to a controller indicating the request is authentic. A system for authenticating a request for access comprises a secured device configured for use with a security token and for monitoring one or more ambient transmissions.

20 Claims, 2 Drawing Sheets

SYSTEM AND METHOD FOR AUTHENTICATING A REQUEST FOR ACCESS TO A SECURED DEVICE

FIELD OF THE INVENTION

The subject invention relates to systems and methods for authenticating requests, and more particularly to a system and method for authenticating requests for access to a secured device configured for use with an RF transmitting security token.

BACKGROUND

In today's world, many devices have been developed to rely upon wireless transfer of information, particularly via radio-frequency (RF) transmissions. For example, some devices are configured to make decisions whether and how to perform a function based on transmitted information such as authentication information that facilitates the verification of an operator's identity and/or the presence of an authorized user. One such device is an automatic remote and/or keyless entry system for an automobile. Another is a remote starter for a vehicle. Still another is a key fob for enabling access to a computer network.

In such systems, an operator or other user requests commencement of a desired process by performing an initiating step. For example, a user might press a button on a key fob configured for unlocking or opening a vehicle door, for starting a vehicle's engine, for accessing a computer system, or opening a garage door. Alternatively, a user might pull on a door handle of the vehicle or might press an ignition/start button on the vehicle instrument panel. In response, an authorization module having the ability to facilitate commencement of the process (e.g., by facilitating the unlocking or opening the vehicle door, starting of the vehicle's engine, permitting access to the computer system, or opening the garage door) may seek to verify that the request is authorized (i.e., may seek to authenticate the request).

To facilitate an authentication process, the user may carry a security token (e.g., a key fob) configured for transmitting or otherwise providing information, including the authentication information. Just as physical keys have traditionally served to provide physical access to locked objects and places, key fobs, smart cards, radio-frequency identification (RFID) tags, and other similar security tokens are now serving to selectively provide access not only to secured objects and places of a physical nature, but also to communication networks and other services (e.g., financial services, information services). In some cases, security tokens may facilitate multiple-factor authentication such as where the presence of the device and the entry of one or more additional piece of information (e.g., a pin number or password, fingerprints or other biometric information, information transmitted from an alcohol-sensing breath tester, etc.) are required.

To render the use of such security tokens practical, they are typically configured to communicate wirelessly with the secured device. In some cases, a secured device and an associated security token may be configured to communicate via sound or light transmissions. More typically, however, the devices communicate via radio-frequency (i.e., RF) transmissions. Unfortunately, wireless transmissions can be susceptible to jamming such as by interference caused by the presence of competing in-band transmissions. For example, competing transmission of light, sound, and/or electromagnetic signals can interfere with (i.e., jam) the reception and/or interpretation of transmissions intended for elements of a particular system. Sources of potentially-interfering ambient transmissions can include a wide variety of stationary or mobile sources. Sometimes, the sources do not operate on a constant basis. As a result, the jamming caused by such sources may cause only sporadic interference with authentication transmissions, rendering the potentially-interfering ambient transmissions difficult to recognize or characterize.

In a secured device configured for use with a security token, a module configured for facilitating authentication (i.e., an authentication module) may fail to detect the presence of the security token in the presence of an interfering or jamming transmission. This can be particularly problematic where the environment in which the authorization module operates undergoes frequent changes. For example, in an automobile equipped with a remote keyless entry (RKE) system or a passive entry/passive start (PEPS) system, the transmissions present in the ambient environment likely change as the location of the vehicle changes. When a vehicle operator attempts to access or start the vehicle's engine in the presence of a potentially-interfering ambient transmission, the authorization module may be unable to authenticate the operator's request; instead displaying a message indicating that no security token is detected. While back-up systems may be available, many vehicle operators do not know of their existence and/or how to use them. Accordingly, such customers may become frustrated and dissatisfied and may seek to have their vehicles towed (or other systems returned) to a depot for repairs. When the jamming transmission is no longer present, the system resumes functioning properly, thereby hampering identification of the source of the problem and further irritating the operator of the system or others.

Accordingly, it is desirable to provide a system and method for authenticating a request for access to a secured system, wherein the system is configured for use with a security token.

SUMMARY OF THE INVENTION

In one exemplary embodiment of the invention, a method for authenticating a request for access to a secured device configured for use with a security token comprises monitoring one or more ambient transmissions present in a local environment, analyzing the one or more ambient transmissions to create a characterization thereof, and transmitting information configured to instruct a security token regarding characteristics of an adapted transmission protocol based on the characterization. The adapted transmission protocol is configured for decreasing a likelihood of interference by the one or more ambient transmissions with reception of an authentication transmission from the security token. An authentication transmission comprising authentication information is received from the security token, and the security token is authenticated based on the authentication information. In response to a request for access, a signal is transmitted to a controller indicating the request is authentic.

In another exemplary embodiment of the invention, a system for authenticating a request comprises a secured device and a security token. The secured device is configured to monitor one or more ambient transmissions present in a local environment, to analyze the transmissions to create a characterization thereof, and to transmit information configured to instruct the security token regarding characteristics of an adapted transmission protocol based on the characterization. The adapted transmission protocol is for use by the security token to transmit authentication information and is configured for decreasing a likelihood of interference by the one or more ambient transmissions with reception of an authentication transmission from the security token. The security token is configured to transmit an authentication transmission containing authentication information in accordance with the adapted transmission protocol, and the secured device is further configured to receive the authentication transmission from the security token, to authenticate the security token based on the authentication information, and, in response to a request for access, to transmit a signal to a controller indicating the request is authentic.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
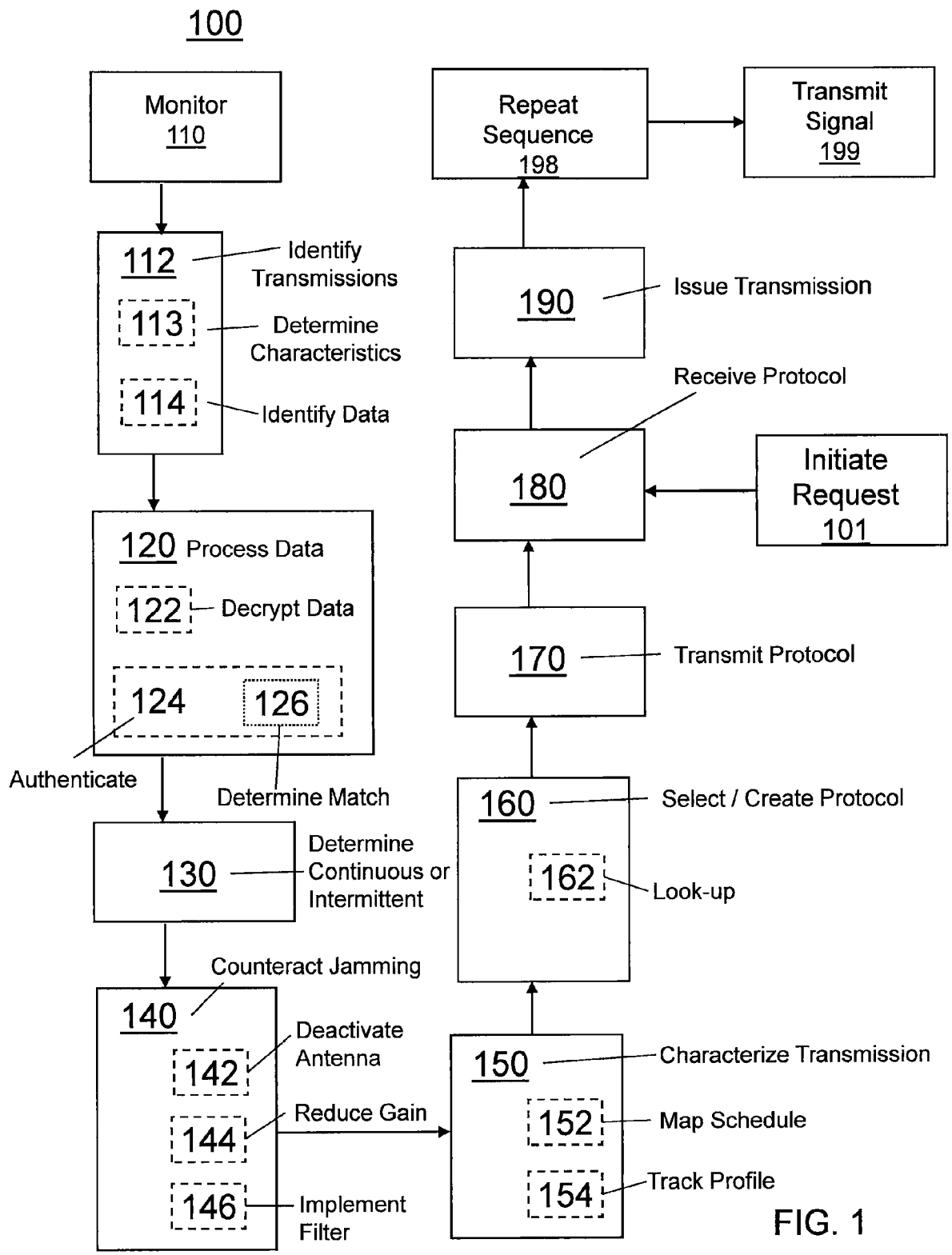
FIG. 1 is a process flow chart presenting an exemplary method for authenticating a request for access to a secured device configured for use with a security token.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows an exemplary method 100 for authenticating a request for access to a secured system. In an exemplary embodiment, a secured device monitors (step 110) ambient transmissions present in the local environment. The ambient transmissions may comprise sound transmissions, light transmissions, or radio frequency transmissions. The monitoring performed by the secured device may be configured to scan the ambient environment for transmissions including noise and to seek to identify (step 112) transmissions of a type corresponding to those expected to be transmitted by a security token configured for use in connection with the secured device.

Having perceived one or more such ambient transmissions, the secured device identifies (step 114) any data encoded in the transmission and processes it (step 120). The step of identifying (step 112) transmissions includes determining (step 113) whether a transmission bears characteristics according to a known protocol. The processing step may include decrypting (step 122) the data and attempting to authenticate (step 124) the security token based on information conveyed in the transmission. This is facilitated by the security token's use of a recognizable protocol and its transmission of unique authentication information that enables such authentication transmissions to be distinguished from other ambient transmissions present in the local environment. Thus, the authentication step may comprise a process for determining (step 126) the extent to which the identified and/or decrypted information matches a predefined identity string.

If a particular transmission does not match a known protocol and/or fails to present perceptible information that matches a predefined identity string (i.e., authentication information), the secured device seeks to develop a strategy for decreasing or avoiding the potential for that ambient transmission to interfere with communication among the secured device and a related security token (i.e., an authentication transmission). In an exemplary embodiment, the secured device determines whether the ambient transmission is substantially continuous or intermittent (step 130). If the ambient transmission is substantially continuous, and an indication of the strength of the ambient transmission (RSSI) is sufficiently great that the ambient transmission is likely to interfere with communication among a secured device and a security token (i.e., an authentication transmission), then the secured device undertakes to counteract the potential jamming effects of the ambient transmission through attenuation (step 140). In an exemplary embodiment, attenuation is accomplished by de-activating (step 142) the antenna. In another exemplary embodiment, attenuation is accomplished by reducing (step 144) the gain of the amplifier. In yet another embodiment, attenuation is accomplished by implementing a filter or a filter network (step 146).

By implementing attenuation, the strength of the interfering ambient transmission (whose source may not be as closely proximate the secured device as a security token likely may be) will be reduced to a greater extent than that of the authentication transmission from the security token. As a result, the authentication transmission received from the security token (so long as it is positioned more closely proximate the secured device than the source of the potentially-interfering ambient transmission) will exhibit a strength that is relatively greater than that of the potentially interfering ambient transmission. An exemplary level of attenuation may be approximately 20-30 db in the transmission path. As a result, the attenuator effectively reduces the interfering character of the ambient transmission.

If a particular ambient transmission is intermittent, such that it does not exhibit reasonably steady signal amplitude, the secured device may seek to characterize (step 150) the ambient transmission so as to enable an adapted protocol to be developed (step 160) that would reduce or avoid any interfering aspects of that ambient transmission. To characterize the ambient transmission, the secured device maps (step 152) the periodically recurring schedule of on- and off-cycles as a function of time. Other attributes of the ambient transmission, such as its RSSI, the baud rate, and the frequency profile are also tracked (step 154) and form additional aspects of the characterization. This characterization may be performed using a microcontroller or another suitable processor in connection with a storage device.

Once the potentially-interfering ambient transmission has been characterized (step 150), an adaptive protocol may be selected or created (step 160) and transmitted (step 170) to be received (step 180) and used by the security token. In choosing or developing an appropriate communication protocol (step 160), the secured device may utilize a look-up table (step 162) containing known sources of jamming signals or sources exhibiting common characteristics. Based on the identified sources or characteristics, the table may provide corresponding protocols that are less likely to be jammed by the potentially-interfering ambient signals or are more likely to be understood by the secured device in the presence of the potentially interfering ambient transmission.

A suitable protocol for decreasing the likelihood or severity of jamming interference with communication among system elements, or for increasing the likelihood of the information carried by an authentication transmission being understood by the secured device in the presence of the potentially-interfering ambient transmission, may include a definition of periodic time intervals during which transmissions should occur and/or frequencies at which the transmissions should be made (e.g., frequency hopping, spectrum spreading) so as to avoid the potential for interference caused by ambient transmissions. In an exemplary embodiment, the adapted protocol is configured so as to improve the likelihood that the information contained in the transmission from the security token (i.e., an authentication transmission) will be capable of being received and understood by the secured device despite the presence of the potentially-interfering ambient transmission.

Thus, an exemplary adapted protocol is configured to avoid the interfering aspects of the jamming ambient transmission. This may be accomplished, for example, by exploiting any periods of relatively lower transmission power exhibited by the ambient transmission. For example, an adapted protocol may prescribe that the authentication transmission from the security token be tailored so as to carry bits of information at times when gaps (i.e., periods wherein the power of the interfering ambient transmission is relatively weaker) occur in the interfering ambient transmission. Accordingly, the authentication transmission dispatched according to the adapted protocol will be less likely to have its content overshadowed by the jamming ambient transmission.

It should be appreciated that a wide variety of modulation schemes are possible. For example, the security token may intermittently transmit information comprising the authentication information. The single bit can be transmitted within a relatively small time window. Outside of the time window, it will not matter what noise may be present in the ambient environment because the secured device will not be expecting to receive transmitted authentication information during those time intervals. In an exemplary embodiment, one or more or several useful adapted protocols may be stored in the security token, enabling the secured device to efficiently select a proven, appropriate protocol and to instruct the security token to use that protocol. In another embodiment, exemplary adaptive protocols are stored and indexed on both the secured device and the security token such that the secured device need only transmit a reference to the selected adaptive protocol, whereby the security token will then know how to configure its subsequent authentication transmission. By merely referencing a protocol that is already known to both the secured device and the security token, rather than prescribing the adaptive protocol in detail, a degree of additional security can be provided against hackers that may be monitoring the transmissions for the purpose of duplicating the prescribed protocol and cloning the security token.

In an exemplary embodiment, a communication protocol is characterized by one or more baud rates, one or more transmission frequencies, one or more signal amplitudes, and a periodic schedule for transmission strings that combine to form each periodic authentication transmission. An exemplary authentication transmission schedule may comprise a single transmission string occurring within each periodic authentication transmission (e.g., a transmission string of 40 ms duration followed by 60 ms of pause) or may comprise a series of transmission strings (e.g., 2, 3, 4, 5, 6, 7, 8, 9, or even 10 or more transmission strings) configured to occupy available time windows within the repeating transmission interval). For example, an exemplary adapted protocol may prescribe that the authentication transmission comprise a series of two transmission strings, such as a first transmission string of 20 ms duration followed by a 30 ms pause followed by a second transmission string of 20 ms duration followed by another 30 ms pause.

Another exemplary adapted protocol may prescribe that the authentication transmission comprise a series of four transmission strings, such as a first transmission string of 10 ms duration followed by a 15 ms pause followed by a second transmission string of 10 ms duration followed by another 15 ms pause followed by a third transmission of 10 ms duration followed by another 15 ms pause and finally a fourth transmission of 10 ms duration followed by a final 15 ms pause. Yet another exemplary adapted protocol may prescribe that the authentication transmission comprise a series of five transmission strings, such as a first transmission string of 8 ms duration followed by a 12 ms pause followed by a second transmission string of 8 ms duration followed by another 12 ms pause followed by a third transmission string of 8 ms duration followed by another 12 ms pause followed by a fourth transmission string of 8 ms duration followed by another 12 ms pause and finally a fifth transmission string of 8 ms duration followed by a final 12 ms pause. Each authentication transmission comprises one or more transmission strings that are scheduled so as to correspond to gaps in the potentially-interfering ambient transmission, and each authentication transmission is of a total duration (e.g., 100 ms) corresponding to an identified period of the potentially-interfering ambient transmission.

An exemplary protocol may prescribe that all authentication transmissions shall occur on a single prescribed frequency (i.e., a fixed frequency protocol) or that the authentication transmission be divided among a number of frequencies spread across a frequency spectrum (i.e., a spread frequency protocol) or may change frequencies over time (i.e., frequency hopping). An exemplary protocol may also prescribe that individual aspects of each authentication transmission (e.g., individual transmission strings) shall occur at one or more amplitudes.

When an operator or the system initiates (step 101) a request of the secured device to perform a predefined function, such as granting access to a system or location or unlocking a door or starting an engine, the secured device issues (step 170) a transmission intended for receipt by the security token. In an exemplary embodiment, the secured device transmits such information to the security token on a frequency of, for example, 125 khz. The transmission from the secured device comprises information configured to instruct the security token regarding the selection or characteristics of a protocol to be used for the security token's forthcoming transmission of authentication information. In essence, the secured device will have determined which communication protocol will be most likely to avoid the interfering aspects of the interfering ambient transmission and instructs the security token to use that protocol. In addition, the transmission from the secured device may include information indicative of a desired time at which the security token should initiate its transmission containing authentication information.

In an exemplary embodiment, the security token receives (step 180) transmissions on a frequency of 125 khz and responds by issuing transmissions containing information in accordance with a prescribed protocol. In an exemplary embodiment, the security token transmits information on a radio frequency of 315 Mhz, and the secured device receives (step 110) transmissions on that frequency. If the information transmitted by the security token is not received or understood by the authorization module, e.g., due to the presence of a potentially-interfering ambient transmission, then the secured device issues (step 170) a transmission including a message intended for the security token requesting that the security token issue (step 190) a transmission in accordance with a different (i.e., adapted) protocol. As described more fully elsewhere herein, that adapted protocol is prescribed by the secured device according to an adaptive algorithm executed by the secured device. In an exemplary embodiment, the above-described sequence repeats until a message is received correctly (step 198).

When the secured device has successfully received and demodulated the RF transmission, and has determined that appropriate authentication criteria have been satisfied, the secured device transmits (step 199) a signal that may be received by a controller (e.g., in the case of a motor vehicle, to a body controller) indicating that appropriate authentication has been achieved. The controller may then facilitate performance of the task requested by the operator (e.g., activation of a PEPS system).

Figure 2:
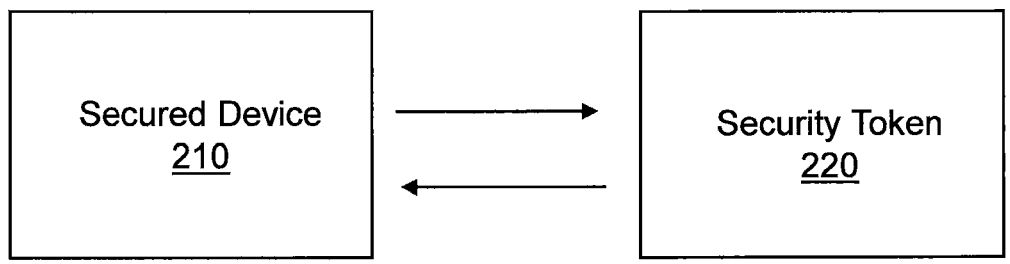
FIG. 2 is a schematic diagram of an exemplary system for authenticating a request, the system comprising a secured device and a security token.

FIG. 2 shows an exemplary system 200 for authenticating a request for access to a secured system, wherein the system comprises a secured device 210 and a security token 220. The secured device 210 is configured to receive transmissions that may be issued by a security token 220. The secured device 210 is also configured to issue transmissions to be received by security token 220. Therefore, in an exemplary embodiment, the secured device 210 is configured to issue RF transmissions configured in accordance with the pre-determined protocol on frequency of 125 khz. In an exemplary embodiment, the secured device 210 is also configured to receive RF transmissions, such as those issued by security token 220, on frequency of 315 Mhz.

Similarly, the security token 220 is configured to receive transmissions that may be issued by a secured device 210. The security token 220 is also configured to issue transmissions to be received by secured device 210. Therefore, in an exemplary embodiment, the security token 220 is configured to issue RF transmissions configured in accordance with the pre-determined protocol on frequency of 315 Mhz. In an exemplary embodiment, the security token 220 is also configured to receive RF transmissions, such as those issued by secured device 210, on frequency of 125 khz.

In an exemplary embodiment, the secured device 210 is configured to monitor transmissions present in the local environment. Accordingly, the secured device 210 may include an antenna, a radio-frequency receiver, an amplifier, and a processor. In an exemplary embodiment, a secured device may be configured for communicating with transmissions that comprise sound transmissions, light transmissions, radio frequency transmissions, or some combination. In accordance with such embodiments, the receiver and amplifier are configured to receive and amplify such signals.

The secured device 210 may be configured to scan the ambient environment for transmissions including noise and to identify transmissions exhibiting characteristics corresponding to those expected to be transmitted by a security token configured for use in connection with the secured device. Accordingly, the secured device 210 may include a processor and a memory storage device, wherein the processor is programmed to perform appropriate scanning and identifying processes. More specifically, in an exemplary embodiment, the secured device 210 is configured to identify any data encoded in a received transmission and to process the data. For example, the secured device may be configured to determine whether a transmission bears characteristics according to a known protocol that is stored in the memory storage device.

The secured device 210 is also configured to decrypt data and to authenticate the security token 220 based on information conveyed in the transmission. Accordingly, the security token is configured to recognize a protocol and unique authentication information suitably to enable a transmission from the security token to be distinguished from other transmissions. Thus, in an exemplary embodiment, the secured system is configured to determine the extent to which the identified and/or decrypted information matches a predefined identity string (i.e., to authenticate a received transmission).

The secured device 210 is also configured to determine whether the transmission is continuous or intermittent and to determine whether an RSSI indication suggests that the strength of the transmission is sufficiently great that it is likely to interfere with a transmission originating from a security token. In addition, the secured device is configured to selectively switch on and off, and/or to selectively modulate, an attenuation of the received transmission so as to counteract or minimize any jamming effects associated with the transmission. In an exemplary embodiment, the secured device is configured to accomplish this attenuation by de-activating the antenna. In another exemplary embodiment, the secured device is configured to accomplish this attenuation by reducing the gain of the amplifier. In yet another exemplary embodiment, the secured device is configured to accomplish this attenuation by implementing a filter or a filter network. An exemplary level of attenuation may be approximately 20-30 db in the transmission path. As a result, the attenuator effectively reduces the interfering character of the potentially-interfering ambient transmission.

The secured device 210 is configured to characterize a received transmission so as to enable an adapted protocol to be developed to effectively reduce or avoid any interfering aspects of the particular transmission. Accordingly, the secured device is configured to map any periodically recurring schedule of on- and off-cycles that me be exhibited by the transmission. In addition, the secured device is configured to track and characterize other attributes of a transmission, such as its RSSI, baud rate, and frequency profile. To facilitate such monitoring, analysis, processing and characterizing of a transmission, the secured device comprises a microcontroller or another suitable processor.

Secured device 210 is also configured to develop or select an adaptive protocol and to transmit it for receipt and use by the security token 220. Thus, a look-up table containing known sources of jamming signals or sources exhibiting common characteristics may be stored in a memory device coupled to the processor. Based on the identified sources or characteristics, the table may be configured to provide corresponding protocols that are less likely to be jammed by the interfering signals or are more likely to be understood by the secured device in the presence of the potentially-interfering ambient transmission.

A suitable protocol for decreasing the likelihood of being jammed by the interfering signals, or for increasing the likelihood of the information carried by the security transmission being understood by the secured device in the presence of the potentially-interfering ambient transmission, may be devised as discussed elsewhere herein.

A secured device is configured to perform one or more predefined functions—such as granting access to a system or location or unlocking a door or starting an engine in response to an operator's request or satisfaction of another initiating condition and satisfaction of one or more authentication criteria. Thus, to facilitate an authentication process, a secured device is configured to issue a transmission intended for receipt by the security token, wherein the transmission from the secured device comprises information configured to instruct the security token regarding the selection or characteristics of a protocol to be used for the security token's forthcoming transmission of authentication information. In addition, the transmission from the secured device may include information indicative of a desired time at which the security token should initiate its transmission containing authentication information.

In an exemplary embodiment, the security token is configured to receive transmissions on a frequency of 125 khz and to respond by issuing transmissions containing information in accordance with a prescribed protocol. The security token is configured to issue transmissions on frequency of 315 Mhz.

Finally, the secured device is configured to transmit a signal that may be received by a controller (e.g., in the case of a motor vehicle, to a body controller) indicating that appropriate authentication has been achieved. The controller is configured to facilitate (e.g. by activation of a switch or emission of a signal) performance of the task requested by the operator (e.g., activation of a PEPS system).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for authenticating a request for access to a secured device configured for use with a security token, the method comprising:
   monitoring one or more ambient transmissions present in a local environment;
   analyzing the one or more ambient transmissions to create a characterization of the one or more ambient transmissions, the characterization comprising a schedule of one or more attributes of each of the one or more ambient transmissions as a function of time;
   transmitting information configured to instruct a security token regarding characteristics of an adapted transmission protocol based on the characterization, the adapted transmission protocol for use by the security token to transmit authentication information, the adapted transmission protocol being configured for decreasing a likelihood of interference by the one or more ambient transmissions with reception of an authentication transmission from the security token;
   receiving an authentication transmission from the security token, the authentication transmission comprising authentication information;
   authenticating the security token based on the authentication information; and
   in response to a request for access, transmitting a signal to a controller indicating the request is authentic.

2. The method of claim 1, wherein the step of monitoring comprises distinguishing, from the one or more ambient transmissions, any transmissions that are of a type corresponding to those expected to be transmitted by a security token configured for use in connection with the secured device.

3. The method of claim 2, wherein the step of monitoring includes determining whether the one or more ambient transmission bears characteristics according to a known protocol.

4. The method of claim 1, further comprising collecting data encoded in the one or more ambient transmissions.

5. The method of claim 4, further comprising decrypting the data.

6. The method of claim 1, wherein the step of authenticating comprises determining whether the information matches a predefined identity string.

7. The method of claim 1, further comprising selecting an adapted transmission protocol from a set of pre-defined adapted transmission protocols.

8. The method of claim 1, further comprising determining whether the one or more ambient transmissions are continuous.

9. The method of claim 8, further comprising assessing a strength of the one or more ambient transmissions.

10. The method of claim 1, further comprising reducing the interfering character of the one or more ambient transmissions.

11. The method of claim 10, wherein the step of reducing comprises attenuating the one or more ambient transmissions.

12. The method of claim 11, wherein the step of attenuating comprises reducing a gain of an amplifier that processes the one or more ambient transmissions.

13. The method of claim 11, wherein the step of attenuating comprises filtering the one or more ambient transmissions.

14. The method of claim 11, wherein the step of attenuating comprises altering the effectiveness of an antenna through which the one or more ambient transmissions are received.

15. The method of claim 1, wherein the step of analyzing comprises mapping a periodically recurring schedule of on- and off-cycles as a function of time.

16. The method of claim 1, wherein the step of analyzing comprises tracking a signal strength, a baud rate, and a frequency profile of the one or more ambient transmissions as a function of time.

17. A system for authenticating a request, the system comprising a secured device and a security token,
   the secured device being configured to monitor one or more ambient transmissions present in a local environment, to analyze the one or more ambient transmissions to create a characterization thereof, and to transmit information configured to instruct the security token regarding characteristics of an adapted transmission protocol based on the characterization, the characterization comprising a schedule of one or more attributes of each of the one or more ambient transmissions as a function of time, the adapted transmission protocol being for use by the security token to transmit authentication information, and the adapted transmission protocol being configured for decreasing a likelihood of interference by the one or more ambient transmissions with reception of an authentication transmission from the security token;
   the security token being configured to transmit an authentication transmission containing authentication information in accordance with the adapted transmission protocol; and
   the secured device being further configured to receive the authentication transmission from the security token, to authenticate the security token based on the authentication information; and, in response to a request for access, to transmit a signal to a controller indicating the request is authentic.

18. The system of claim 17, wherein the secured device is configured to distinguish, from the one or more ambient transmissions, any transmissions that are of a type corresponding to those expected to be transmitted by a security token configured for use in connection with the secured device.

19. The system of claim 17, wherein the secured device is configured to determine whether the one or more ambient transmission bears characteristics according to a known protocol.

20. The system of claim 17, wherein the secured device is configured to reduce the interfering character of the one or more ambient transmissions by attenuating the one or more ambient transmissions.

\* \* \* \* \*